Sept. 22, 1970          E. MARCUS          3,529,460
                     LOAD SENSOR AND CONTROLLER
Filed Feb. 23, 1968                        2 Sheets-Sheet 1
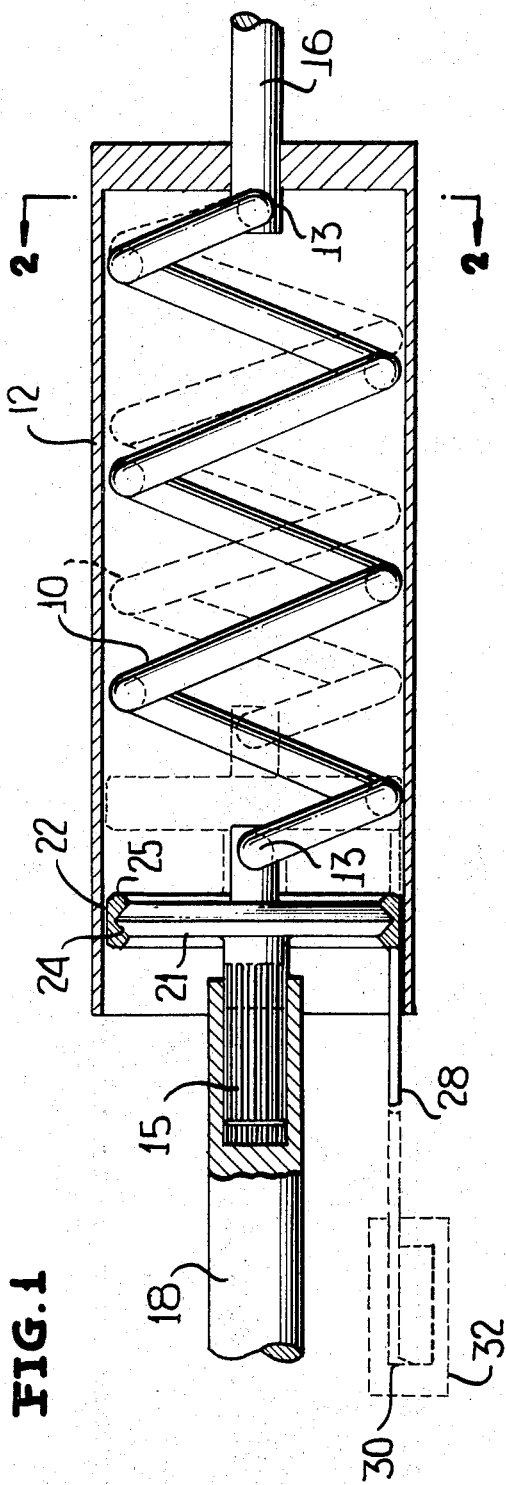
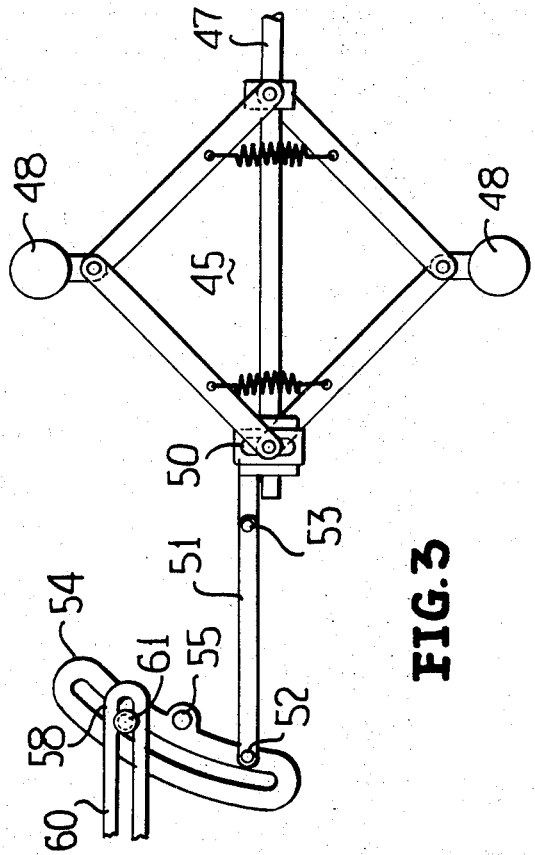
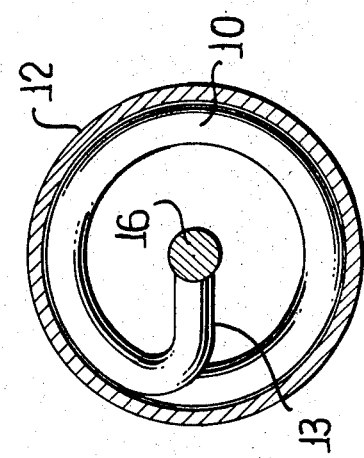
INVENTOR
ERNST MARCUS
BY *Hurvitz, Rose & Greene*
ATTORNEYS Sept. 22, 1970  E. MARCUS  3,529,460
LOAD SENSOR AND CONTROLLER
Filed Feb. 23, 1968  2 Sheets-Sheet 2

INVENTOR
ERNST MARCUS
BY *Hurwitz, Rue & Greene*
ATTORNEYS

United States Patent Office 3,529,460
Patented Sept. 22, 1970

3,529,460
LOAD SENSOR AND CONTROLLER
Ernst Marcus, Casilla 258, La Paz, Bolivia
Filed Feb. 23, 1968, Ser. No. 707,593
Int. Cl. G01l, 3/06
U.S. Cl. 73—136                                   5 Claims

ABSTRACT OF THE DISCLOSURE

A device for sensing increases or decreases in the magnitude of a rotatable load utilizes a helical spring coiled within a tube, the spring having one of its ends coupled to a shaft for rotation only, and the other of its ends coupled to a further shaft for combined rotation and translation along the axis of the spring. A linkage member or arm is coupled to the latter end of the spring for response to translation by the spring only. As the load increases, the spring responds by winding up in compression, but is restrained from spreading outwardly by confinement within the tube. This compression is accompanied by contraction in the length of the spring, which is followed by the load sensing linkage. The reverse effect is achieved when the load decreases; i.e., the spring unwinds and is extended in length. In the event that the power input is not invariant, a linkage is provided which includes a device for converting rotational motion to translation, and a cam, for representing the variations in power input and for controlling other devices in accordance therewith.

BACKGROUND OF THE INVENTION

The present invention relates generally to devices for sensing or measuring torque and in particular to devices for sensing the magnitude of a rotational load coupled to a shaft and for controlling the operation or movement of other devices in accordance therewith.

Prior art load sensors or controllers generally employ elaborate and expensive servomechanism arrangements.

SUMMARY OF THE INVENTION

Briefly, according to the present invention the apparent load on a rotating power source such as a dynamoelectric machine is sensed to the extent that it increases or decreases from a predetermined magnitude, by applying the power input to a helical spring coiled within a tube. One end of the spring (either the driven end or the load end) is confined for rotation only while the other end is permitted to undergo rotation as well as translation. When the source of rotational power is coupled to the spring via a shaft, and the load coupled to the other end of the spring via a shaft, any increase in the magnitude of the load is accompanied by winding up of the spring until the energy stored therein matches the load demands; and by detecting the change in length of the spring, that is to say, the amount by which the spring length has been shortened (or increased) as a result of its being wound up within the confines of the tube, one obtains an indication or measure of the change in magnitude of the load. The change in spring length is detected by attaching or otherwise coupling a follower member, such as an arm or other linkage, to the end of the spring permitted to undergo translation. The follower member may be attached to a pointer of a meter to provide a visual indication of load variations, or may be attached to any other driving linkage to operate or control the movement of other devices in accordance with these variations in the magnitude of the load.

In accordance with a further aspect of the present invention, load sensing and control is reliably achieved in instances where a variable power input is utilized, by providing in the sensing device a parallel path in which the rotational motion of the driving member is converted to translational or lateral movement which is, in turn, converted from a linear to a non-linear function to represent the variations in input power and thus to provide the means to maintain a preferred relationship, automatically, between load and power.

Accordingly, it is a principal object of the present invention to provide a reliable and efficient sensing and control device, operative to respond to variations in the magnitude of rotational load on a shaft.

It is a further object of the present invention to provide a sensing and control device of the type described in which means are provided to represent the variations in input power applied to the load.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawing in which:

FIG. 1 is a sectional view of an embodiment of the invention taken lengthwise along the longitudinal axis of the sensing spring and its housing, this embodiment for use with invariant power sources;

FIG. 2 is an end view of the spring and shaft of FIG. 1 taken from the right-hand side of that figure;

FIG. 3 is a fragmentary view of a linkage suitable for use with the embodiment of FIG. 1 where a variable power source is employed;

DESCRIPTION OF THE PREFERRED EMBODIMENT

Figure 4:
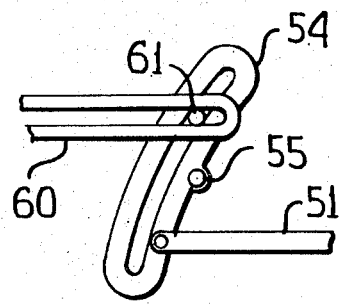
FIGS. 4 and 5 illustrate various operational positions of the cam and associated linkage of FIG. 3.

Referring now to the drawings, and in particular to FIGS. 1 and 2 thereof, the load sensor includes a helical spring 10 confined within a cylinder or tubular housing 12. Helical spring 10 is itself coiled within tubular housing 12 such that its outer coil diameter is substantially equal to the inner diameter of the housing, and has a pair of ends coupled to respective shafts 15 and 16 via connecting arms 13 (see, e.g., FIG. 2). The end of the housing adjacent shaft 16 is fastened to the shaft to permit the housing to rotate in unison with the spring. This prevents friction between spring and housing that would lead to loss of power, unnecessary wear of spring and housing, and/or undesirable influence on sensitivity of the spring.

The other end of spring 10 is, as previously stated, coupled to a second shaft 15 via an arm 13 and a cylindrical plate or cross bar 21 having a bearing surface 22 in the shape of an inverted V to engage and permit freedom of rotation in the V-shaped groove 24 in confining ring or collar 25. Collar 25 has an outer diameter slightly less than that of the inner diameter of cylindrical housing 12, such that the collar is free to move along the longitudinal axis of the housing without binding. Shaft 15 is splined to engage female splines within a hollow core of a coupling shaft 18, when the former is inserted into the core of the latter. Shaft 18 is permitted to rotate but is fixed in any convenient manner to prevent translation thereof along the longitudinal axis of the configuration.

Accordingly, both shafts 16 and 18 are free to rotate but are restrained to prevent longitudinal movement; whereas shaft 15 is free to rotate and, because of the splined configuration of its longitudinal surface and the mating surface, and the freedom of translation of collar 25, is also free to move in either direction along the longitudinal axis of the configuration. The extent of that longitudinal movement will depend upon changes in the magnitude of the load which may be coupled to either of shaft 16 or shaft 18 with the rotating power input or driving member coupled to the other. The lengths of shaft 15 and its mating hollow core in shaft 18 should therefore conform to the greatest expected movement of the spring axially of the housing.

In operation of the device, when interposed between a rotary power input coupled to shaft 16 and a rotational load coupled to shaft 18, the length of coiled spring 10 tends to remain constant for a particular magnitude of the load and an invariant driving power. In this respect, it will be observed that the deveice may be constructed to conform to a specified value of load with a constant power input. If the magnitude of the load on shaft 18 should increase, the spring 10 compresses in accordance therewith; that is to say, the spring will be wound up as a result of increased resistance to torque, caused by the increase in load, while the shaft 16 continues to rotate at its former rate since it is unable to respond to an immediate change in the load coupled to the shaft 18 because of the interposition of the spring therebetween. For a brief interval of time, then, shaft 16 rotates at a speed exceeding that which would otherwise be permitted by the increased load on shaft 18, and spring 10 compresses in length by an amount which is a function of the increased load, the cylindrical plate 21 pulling collar 25 further into the housing as the spring undergoes compression.

An arm or other suitable linkage 28 is fastened to ring or collar 25 for longitudinal movement therewith and may be used to control the movement of any desired utilization device. For example, in FIG. 1 the arm 28 is shown as being connected to a pointer 30 of a meter 32 having suitable scale for indicating increases or decreases in the magnitude of the load from a predetermined normal or desired value. Alternatively, linkage 28 may be employed to adjust the load magnitude or to control the movement of other devices in accordance with the variation in magnitude of the rotating load coupled to shaft 18. For example, arm 28 may be coupled to a stepless variable transmission, such as a pair of pulleys with variable diameter sheaves whose connecting belt is moved upwardly or downwardly along the sheaves by the movement of arm 28, to vary the rotational speed of an ancillary device. The load sensing device of FIGS. 1 and 2 may also be employed to operate in conjunction with a stepped transmission, in which case arm or linkage 28 may be utilized as a gear shift lever. It will be readily observed, furthermore, that linkage 28 may be so coupled to the load in any of a number of arrangements familiar to those skilled in the art to permit adjustment of the magnitude of the load to a desired value should it increase or decrease from that value. In other words, the device of FIGS. 1 and 2 is suitable for use as a governor to maintain uniform magnitude of rotating load in conjunction with a constant input torque.

If the rotational power input to shaft 16 is not invariant, spring 10 will undergo expansion or compression in length in accordance with changes in input power. For example, if input power increases there is an inertial resistance to change in momentum. Furthermore, the load increases, since it is moved at higher speed. According to a further important feature of the invention, means are utilized with the device of FIGS. 1 and 2 to correspond to variations in the power input applied to shaft 16. According to this aspect of the invention, and with particular reference to FIG. 3 of the drawings, a centrifugal governor assembly 45 of conventional construction is coupled for rotation with a shaft 47 connected to the same power input as shaft 16 of FIG. 1. Thus, both of shafts 16 and 47 have the same response to variatitons in the power input. Thereby, if the rotational forces applied to the shaft 16, and, of course, to shaft 47, should increase, weights 48 of governor 45 are forced outwardly, compressing or shortening the axial length of the governor (along the axis of shaft 47). In essence, the centrifugal governor assembly 45 translates the rotational speed of shaft 47 to lateral displacement of a sleeve 50 to which it is also coupled and through which shaft 47 extends. Sleeve 50 is constructed to permit relative rotation of governor 45 in response to rotation of shaft 47, and to undergo translation in response to extension or contraction of the governor along the axis of shaft 47. Therefore, as the speed of rotation of shaft 47 increases, and the governor length is shortened, sleeve 50 is pulled further along shaft 47, in a direction to the right as viewed in FIG. 3, and carries therewith an arm 51 which is pivotally coupled at points 52 and 53. Since arm 51 is to move in its plane, rather than rotate, the coupling between sleeve 50 and arm 51 may be entirely similar to that shown in FIG. 1 for rendering arm 28 a follower member.

Figure 5:
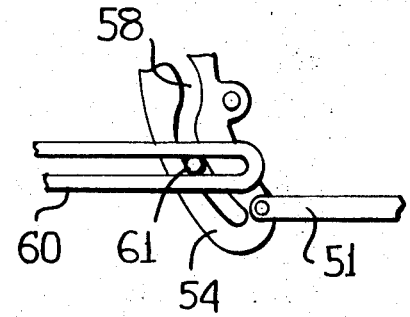

The pivotal coupling point 52 occurs between arm 51 and a slotted plate 54 operating as a cam, the latter arranged to pivot about an axis defined by pin 55. Pivot point 55 is fixedly attached to a support member (not shown) while pivot points 52 and 53 are free to permit angular displacement of arm 51 relative to the axis of shaft 47, for rotating the cam. Slot or channel 58 is curved, in a manner to be discussed in greater detail in the ensuing description, and intersects a fixed channel member 60. The point of intersection confines a pin or pivot 61 that moves both along slot 58 and laterally along channel 60 as plate 54 is pivoted about axis 55. The position of pivot 61 is determined by the movement of plate 54 and the particular shape of slot 58. Channel member 60 is secured by a support (not shown) to render its position fixed. In other words, it will be observed that as sleeve 50 undergoes lateral displacement in response to variatitons in the axial length of governor 45 (in response to variations in rotational speed of shaft 47), that displacement is transmitted by arm 51 to plate 54, and there converted to rotational movement. The interplay of slot 58 and channel 60 converts it back into lateral displacement of a magnitude that is a function— linear or non-linear, depending on contour of slot 58— of the original displacement of sleeve 50. See, e.g., FIGS. 4 and 5.

Figure 6:
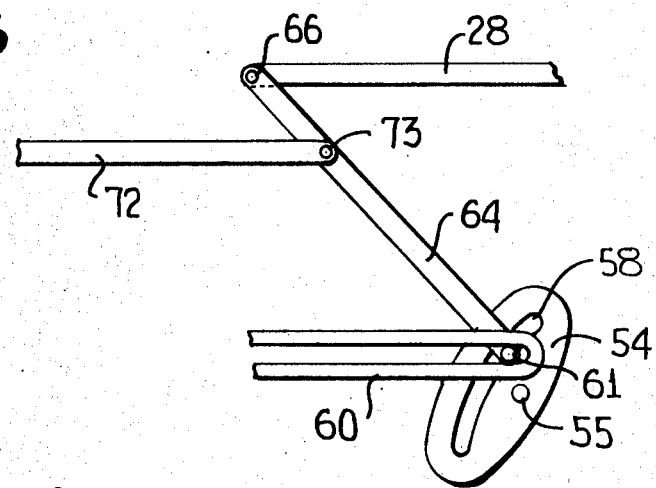
FIG. 6 is a fragmentary view of additional linkage members or mechanisms coupled to the cam and linkage of FIG. 3 and to the sensing apparatus of FIG. 1.

Referring to FIG. 6, an arm 64 is arranged to pivot about the axis provided by rivet or pin 61 at one of its ends and at the other end to pivot about an axis 66 arranged to follow the movements of arm 28 of the device of FIGS. 1 and 2. The longitudinal movement of arm 28 provides the load sensing function previously described with respect to FIGS. 1 and 2, while the movement of pivot point 61 within the cam is effective to express a function corresponding to variations in the power input. To permit simultaneous pivoting of arm 64 at both its ends, it is slotted, as indicated by reference numerals 69 and 70, where it engages pivots 61 and 66. It will be observed, then, that the lateral displacement of an arm 72 pivotally coupled to arm 64 at a point 73 therealong is proportionately controlled by the change in length of spring 10 (and thus in the variation in the magnitude of the load coupled to shaft 18) and by the variations in axial length of governor 45 (and hence to the variations in power input to shafts 16 and 47). Arm or linkage 72 may be coupled to a utilization device for control of the latter in accordance with the lateral displacement of the former so as to maintain a preferred relationship between load and power.

Figure 7:
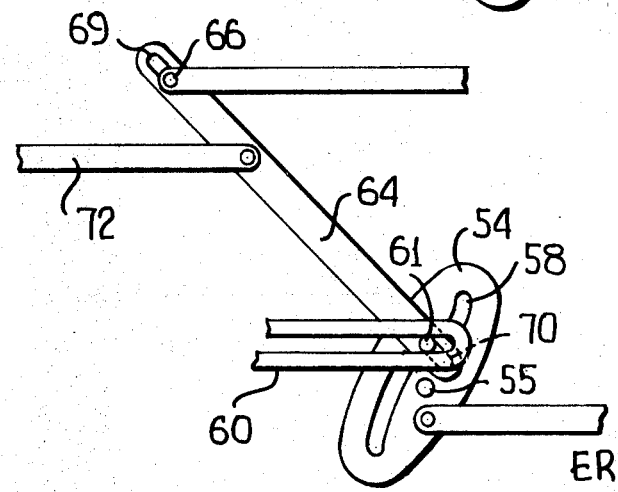
FIG. 7 is a modification of the apparatus of FIG. 6.

The specific location of pivot point 61 within the slot 58 of the cam and the slot of the channel member 60 varies along a cam surface which is contoured to represent the non-linear function between power input variations to shaft 47 and the rotational speed variations of that shaft, to convert this non-linear function to a linear displacement based on the specific location of pivot point 61. It will be observed, for example, that in an internal combustion engine, the maximum torque may be obtained at about 70% of the allowable range of revolutions per minute (r.p.m.) of the shaft. In the upper part of the r.p.m. curve of the engine, it frequently happens that torque is less than that occurring at lower rotational speeds. Accordingly, the shape of the cam surface, i.e., the contour of slot 58, should be designed to correspond to the behavior of the power source. If slot 58 is properly curved, it will ensure variation of the location of pivot point 61 that most nearly corresponds to the torque versus rotational speed curve of the specific power source used. Such an arrangement is shown in FIG. 7, where the curvature of slot 58 varies in accordance with the particular non-linear function represented by the source of rotational power.

In operation of the overall device, as the speed of shaft 16 (and, of course, shaft 47) increases, spring 10 compresses, thereby moving arm 28 to the right as viewed in the figures. This same increase in rotational speed of shafts 16 and 47 will, however, result in a displacement of pivot point 61 to the left as a result of the curvature of the cam slot 58. Since the location of pivot point 73 and the corresponding displacement of arm 72 are dependent upon the instantaneous locations of pivot points 61 and 66, the lateral displacement of pivot point 61 to the left, as observed in the drawings, will represent input power. Accordingly, the lateral displacement of arm 72 is a function of the magnitude of rotational load, in combination with values representing input power, and it also may correspond to a preferred relationship between load and input power by appropriate modification of the curvature of the cam surface.

I claim:
1. Apparatus for sensing variations in the magnitude of the load on a source of rotational power and for controlling the operation of a utilization device in accordance with said variations, said apparatus comprising resilient means coupling said source to said load and responsive to variations in magnitude of said load to undergo a variation of a physical dimension, means for restraining said resilient means to render said variation in said physical dimension thereof proportional to said load magnitude variations, means coupling said resilient means to said utilization device to render said device responsive to said variations in said physical dimension, wherein said physical dimension is the length of said resilient means, and wherein said means for restraining includes means for restricting the motion of said resilient means at one end thereof to rotation only and for permitting the other end of said resilient means to undergo combined rotation and translation, wherein said resilient means is a helical spring, and wherein said restraining means includes a housing within which said helical spring is coiled, said housing confining the diameter of said helical spring to a predetermined value to prevent radial spreading thereof, said helical spring coupled at one of its ends to said source of rotational power and at the other of its ends to said load.

2. The combination according to claim 1 wherein said means for permitting rotational and translational motion of said other end of said spring comprises a bearing confined within said housing and free to move along the longitudinal axis thereof while supporting rotation of said other end of said spring, said other end of said spring coupled to a shaft having a splined free end, and said load coupled to a further shaft adapted to mate with the splined surface of the first-named shaft to permit relative axial translation of said shafts and combined rotation thereof.

3. A mechanical coupling, comprising
a first shaft,
said first shaft being rotary and translatory on its own axis,
a second shaft,
said second shaft being rotary only,
a helical spring coupling said first shaft to said second shaft,
said helical spring having an outer diameter,
a cylinder encompassing said helical spring and having an inner diameter approximately equal to said outer diameter.

4. The combination according to claim 3, wherein is further provided means for indicating the extent of translatory motion of said first shaft.

5. A flexible shaft coupling, comprising
a first shaft,
a second shaft,
means mounting said first shaft for both translation and rotation,
means mounting said second shaft for rotation only,
a helical spring intercoupling said shafts, and
means for preventing expansion of the outer diameter of said helical spring while enabling variations of its length.

References Cited
UNITED STATES PATENTS

| | | | |
|---|---|---|---|
| 235,164 | 12/1880 | Mather | 73—136 |
| 945,757 | 1/1910 | Crowell | 73—138 |
| 2,260,036 | 10/1941 | Kuehni | 73—88.5 XR |
| 2,345,444 | 3/1944 | Angst | 73—136 |
| 2,737,049 | 3/1956 | Waugh | 73—136 |
| 3,403,551 | 10/1968 | Agostini | 73—139 |

FOREIGN PATENTS 413,427  4/1967  Switzerland.

CHARLES A. RUEHL, Primary Examiner

U.S. Cl. X.R.

64—15